United States Patent
Inoue et al.

(10) Patent No.: US 8,419,099 B2
(45) Date of Patent: Apr. 16, 2013

(54) VEHICLE BODY STRUCTURE

(75) Inventors: Toshihiro Inoue, Commerce Township, MI (US); Hugo Fortin, Commerce Township, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/188,140

(22) Filed: Jul. 21, 2011

(65) Prior Publication Data

US 2013/0020822 A1    Jan. 24, 2013

(51) Int. Cl.
*B60R 13/02* (2006.01)

(52) U.S. Cl.
USPC ........... 296/1.08; 52/716.5; 52/716.7; 24/297

(58) Field of Classification Search ............ 296/209, 296/1.08, 146.5; 293/128; 52/716.1, 716.5, 52/716.7; 428/31; 24/289–292, 297
See application file for complete search history.

(56) References Cited

U.S. PATENT DOCUMENTS

| | | | | |
|---|---|---|---|---|
| 2,741,324 | A * | 4/1956 | Anderson | 180/90 |
| 4,529,244 | A * | 7/1985 | Zaydel | 296/191 |
| 4,707,020 | A * | 11/1987 | Enokida et al. | 296/191 |
| 4,886,312 | A | 12/1989 | Asoh | |
| 5,356,195 | A * | 10/1994 | Kanda | 296/180.1 |
| 5,360,253 | A | 11/1994 | Sasaki et al. | |
| 6,612,642 | B2 | 9/2003 | Kasahara | |
| 7,220,032 | B2 | 5/2007 | Mori | |
| 7,490,891 | B2 | 2/2009 | Terakawa et al. | |
| 8,083,285 | B2 * | 12/2011 | Yanagida et al. | 296/181.5 |

FOREIGN PATENT DOCUMENTS

| | | |
|---|---|---|
| DE | 3539177 | 5/1987 |
| FR | 2085623 | 8/2009 |
| JP | S57-87768 | 6/1982 |
| JP | S60-78875 | 5/1985 |
| JP | H01-18785 | 1/1989 |
| JP | H08-276871 | 10/1996 |
| JP | H10-167126 | 6/1998 |
| JP | 2006-117072 | * 5/2006 |
| JP | 2008-062810 | 3/2008 |

OTHER PUBLICATIONS

2011 Odyssey, Exterior Trim Component Location Index excerpt, 2011 Honda Odyssey service manual.
2011 Odyssey, Tailgate Spiler Trim Replacement excerpt, 2011 Honda Odyssey service manual.

* cited by examiner

*Primary Examiner* — Dennis Pedder
(74) *Attorney, Agent, or Firm* — Global IP Counselors, LLP

(57) ABSTRACT

A vehicle body structure includes a vehicle body panel, a trim panel and a first mounting arrangement. The vehicle body panel includes interior and exterior attached panels. The exterior panel includes a base surface extending along a peripheral edge of the vehicle body panel and a mounting surface that is raised relative to an adjacent portion of the base surface. The mounting surface defines an aperture that extends to an opposite concave surface of the exterior panel. The base surface of the exterior panel abuts the interior panel along a majority of a perimeter of the mounting surface. The trim panel is coupled to the vehicle body panel. The first mounting arrangement couples the trim panel to the vehicle body panel and engages a periphery of the aperture through the mounting surface to at least partially retain the trim panel to the vehicle body panel in an installed position.

17 Claims, 7 Drawing Sheets

VEHICLE BODY STRUCTURE

BACKGROUND

1. Field of the Invention

The present invention generally relates to a vehicle body structure. More specifically, the present invention relates to a vehicle body structure having a trim panel coupled to a vehicle body panel.

2. Background Information

Conventionally, exterior garnishments on vehicles need to be securely attached to an exterior body panel of the vehicles to endure varying weather conditions, travel environments, and incidental contact with vehicle owners and other objects. Modern vehicle styling trends tend to limit the body surface area available for the attachment of such garnishments. For example, a rear spoiler is attached to a trunk or back door (e.g., a lift-gate or a rear hatch) only at a few select locations. Specifically, a high-mounted rear spoiler on a back door is often attached across the top edges of the back door adjacent to the rear edge of the roof. There is typically sufficient mounting space across the top of the back door to mount such a spoiler structure. However, it becomes more difficult to find sufficient mounting surface area in other locations.

SUMMARY

Some rear vehicle spoilers include trim panels that run at least partially down the side edges of the back door. It has been discovered that the body surface area available for attachment of such trim panels at the side edges of the back door is limited.

One object of the present disclosure is to provide a vehicle body structure which ensures a secured attachment of a trim panel even at a location having limited body surface area.

In view of the state of the known technology, one aspect of the present disclosure is to provide a vehicle body structure. The vehicle body structure includes a vehicle body panel, a trim panel and a first mounting arrangement. The vehicle body panel includes an interior panel and an exterior panel that are fixed to one another. The exterior panel includes a base surface extending along a peripheral edge of the vehicle body panel and a mounting surface that is raised relative to an adjacent portion of the base surface. The mounting surface defines an aperture that extends to an opposite concave surface of the exterior panel. The base surface of the exterior panel abuts the interior panel along a majority of a perimeter of the mounting surface. The trim panel is coupled to the vehicle body panel. The first mounting arrangement couples the trim panel to the vehicle body panel. The first mounting arrangement is engaged with a periphery of the aperture through the mounting surface to at least partially retain the trim panel to the vehicle body panel in an installed position.

These and other objects, features, aspects and advantages of the vehicle body structure will become apparent to those skilled in the art from the following detailed description, which, taken in conjunction with the annexed drawings, discloses one embodiment.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Figure 1:
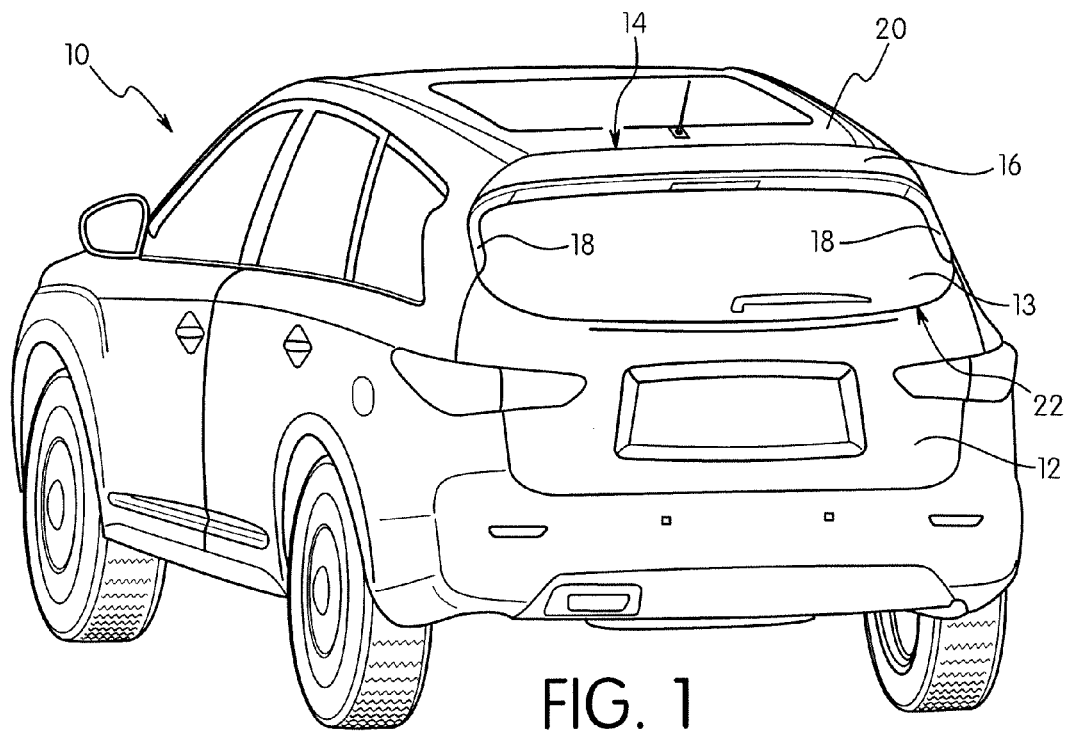
FIG. 1 is a rear perspective view of a vehicle having a rear body structure with a mounting structure for coupling a trim panel to a back door in accordance with one illustrated embodiment.
Figure 2:
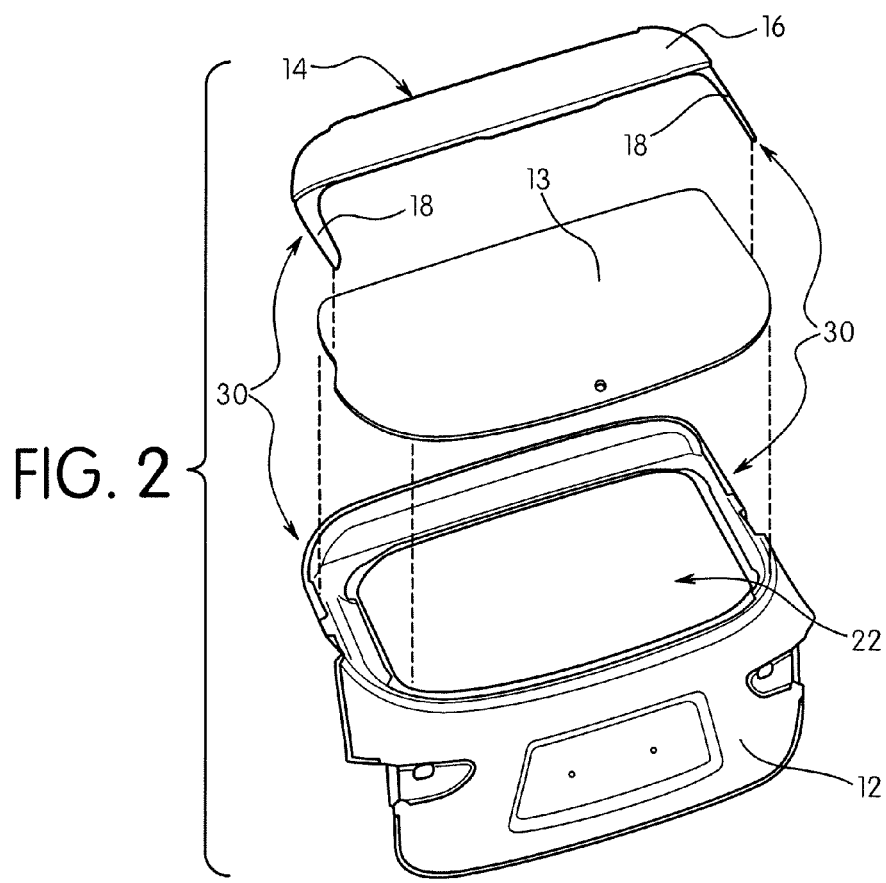
FIG. 2 is an exploded rear perspective view of the rear body structure of the vehicle illustrated in FIG. 1.

Referring initially to FIGS. 1 and 2, a rear body structure (e.g., vehicle body structure) of a vehicle 10 is illustrated in accordance with one embodiment. The rear body structure of the vehicle 10 includes, among other things, a back door 12, a rear window glass (e.g., window panel) 13, and a spoiler unit 14 with a rear spoiler 16 and a pair of trim panels 18. The back door 12 is typically formed of metal or any other suitable material that is typically used in vehicles. The back door 12 is pivotally mounted to a roof panel 20 of the vehicle 10 by a pair of hinges (not shown) to form a so-called hatch-back type vehicle. The back door 12 defines an opening 22. The rear window glass 13 is disposed on the back door 12 to cover the opening 22. Specifically, the rear window glass 13 is fixedly coupled to an exterior surface of the back door 12 in a conventional manner well known in the art such that the exterior surface of the back door 12 provides a peripheral mounting for the perimeter of the rear window glass 13. The spoiler unit 14 is arranged to improve the aerodynamics and exterior appearance of the vehicle 10.

Figure 3:
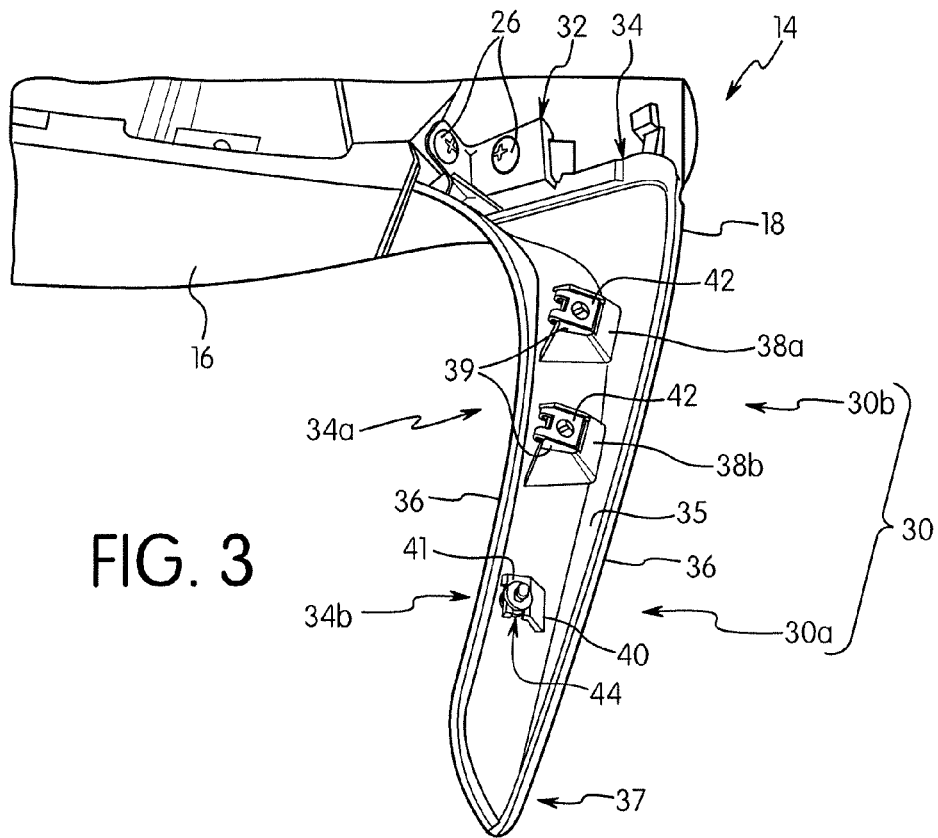
FIG. 3 is an enlarged elevational view of the trim panel of the vehicle illustrated in FIG. 1 showing the mounting structure of the trim panel side.

The rear spoiler 16 and the trim panel 18 are made of plastic or any other suitable material that can have enough rigidity, such as fiberglass, silicon or carbon fiber. The rear spoiler 16 is integrally formed as a one-piece, unitary member. Each of the trim panels 18 is also integrally formed as a one-piece, unitary member. The rear spoiler 16 and the trim panels 18 are fixedly coupled together to form the spoiler unit 14. As illustrated in FIG. 3, the trim panels 18 are fastened to the rear spoiler 16 at both lateral end portions of the rear spoiler 16 with screws 26. The spoiler unit 14 (i.e., the rear spoiler 16 and the trim panels 18) are fixedly coupled to the exterior surface of the back door 12 such that the rear spoiler 16 is coupled to the back door 12 across the top edge of the back door 12. Furthermore, each of the trim panels 18 is fixedly coupled to the exterior surface of the back door 12 via a pair of mounting structures 30 (see also FIG. 2) such that the trim panels 18 extend downward from the rear spoiler 16 along both side edge portions (e.g., peripheral edge portions) of the rear window glass 13, respectively.

Referring to FIGS. 3-7, the back door 12, the trim panels 18 and the mounting structures 30 will be further explained in detail. Hereinafter, only one of the trim panels 18 (i.e., the trim panel 18 on the left side of the vehicle 10 in FIGS. 1 and 2) will be further explained in detail. The detailed description of the other of the trim panels 18 (i.e., the trim panel 18 on the right side of the vehicle 10 in FIGS. 1 and 2) will be omitted for the sake of the brevity since the trim panels 18 are mirrored structurally across a lateral center of the vehicle 10. Furthermore, only one of the mounting structures 30 (i.e., the mounting structure 30 on the left side in FIGS. 1 and 2) will be further explained in detail. Similarly, the detailed description of the other of the mounting structures 30 (i.e., the mounting structure 30 on the right side in FIGS. 1 and 2) will be omitted for the sake of brevity since the mounting structures 30 are also mirrored structurally across a lateral center of the vehicle 10.

Figure 4:
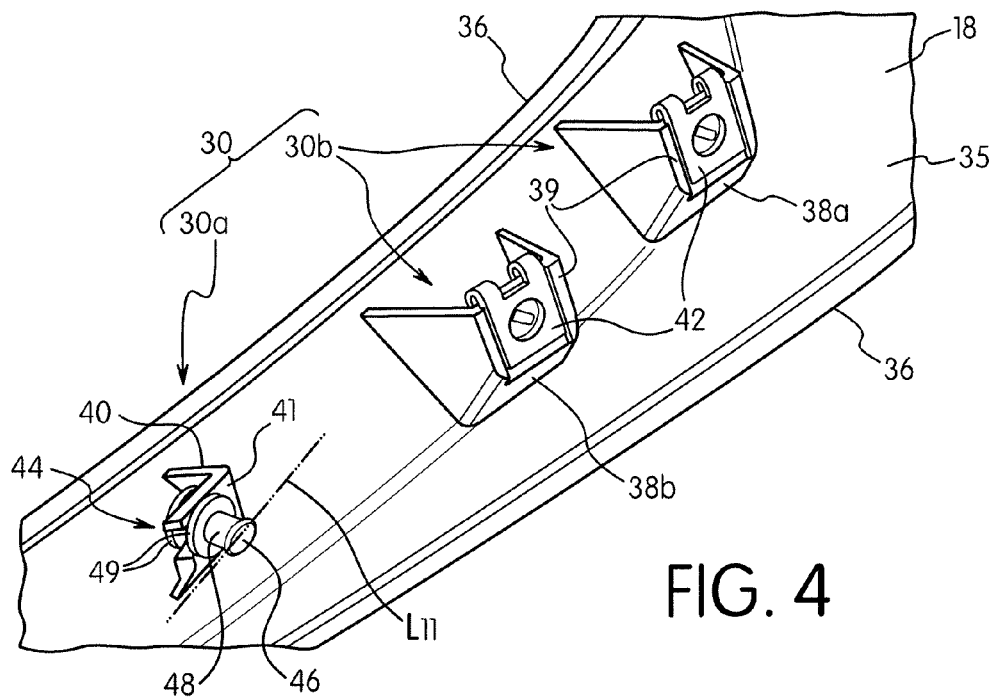
FIG. 4 is a detailed perspective view of the trim panel of the vehicle illustrated in FIG. 1 showing the mounting structure of the trim panel side.
Figure 8:
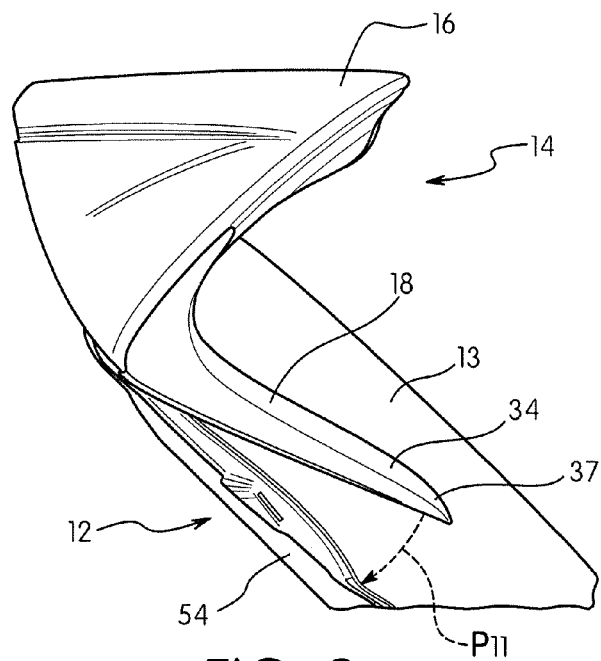
FIG. 8 is a partial side elevational view of the rear body structure of the vehicle illustrated in FIG. 1 showing a nonlinear movement during an installation of the trim panel relative to the back door.

As illustrated in FIGS. 3 and 4, the trim panel 18 includes an attachment portion 32 and a tapering portion 34. The attachment portion 32 has a pair of screw holes, and is fastened to the lateral end portion of the rear spoiler 16 with the screws 26 that are disposed through the screw holes in the attachment portion 32. The tapering portion 34 has a pair of peripheral edges (e.g., peripheral side edge) 36 that merge at a distal end portion (e.g., tapering end portion) 37 of the tapering portion 34. In other words, the width between the peripheral edges 36 of the tapering portion 34 in a widthwise direction of the tapering portion 34 becomes narrower toward the distal end portion 37 of the tapering portion 34 along a lengthwise direction of the tapering portion 34. Furthermore, as illustrated in FIG. 8, the depth of the tapering portion 34 also decreases in a direction that is normal to the rear body structure of the vehicle 10 along the lengthwise direction of the tapering portion 34. Furthermore, the tapering portion 34 includes a primary section (e.g., primary portion or second section) 34*a* and a secondary section (e.g., secondary portion or first section) 34*b* (see FIGS. 12 and 13). The primary section 34*a* is formed between the attachment portion 32 and the secondary section 34*b*. The secondary section 34*b* attaches to the primary section 34*a* at an end of the secondary section 34*b* that is opposite the distal end portion 37 of the tapering portion 34.

As illustrated in FIGS. 3 and 4, the tapering portion 34 includes upper and lower raised sections (e.g., standoffs) 38*a* and 38*b*, respectively, and an attachment section 40 on an interior surface 35 of the tapering portion 34. The interior surface 35 of the tapering portion 34 is defined between the peripheral edges 36 of the tapering portion 34, and is formed on a mounting side of the trim panel 18. The mounting side of the trim panel 18 is coupled to the exterior surface of the back door 12 and is opposite an exposed side that faces away from the exterior surface of the back door 12. The upper and lower raised sections 38*a*, 38*b* are formed on the interior surface 35 of the primary section 34*a* of the tapering portion 34, thereby defining cavities between the upper and lower raised sections 38*a*, 38*b* and the interior surface 35 of the tapering portion 34. In other words, the upper and lower raised sections 38*a*, 38*b* extend or protrude away from the interior surface 35 of the tapering portion 34. Each of the upper and lower raised sections 38*a*, 38*b* has a raised plate 39 with a through hole through which the cavity is accessed. Each of the raised plates 39 is located spaced apart from the interior surface 35 of the tapering portion 34. The attachment section 40 is formed on the interior surface 35 of the secondary section 34*b* of the tapering portion 34. The attachment section 40 includes a raised plate 41 with a notch. The raised plate 41 is located spaced apart from the interior surface 35 of the tapering portion 34.

The upper and lower raised sections 38*a*, 38*b* and the attachment section 40 are formed at spaced apart locations, respectively, on the interior surface 35 of the tapering portion 34. The upper and lower raised sections 38*a*, 38*b* and the attachment section 40 are also aligned in the lengthwise direction of the tapering portion 34. The width of the tapering portion 34 narrows toward the distal end portion 37 of the tapering portion 34 in a lengthwise direction of the tapering portion 34, as mentioned above. Thus, the widths of the tapering portion 34 at both the upper and lower raised sections 38*a*, 38*b* are larger than the width of the tapering portion 34 at the attachment section 40. Furthermore, as illustrated in FIGS. 3, 4 and 11-13, the depth of the tapering portion 34 also decreases toward the distal end portion 37 of the tapering portion 34. In particular, the primary section 34*a* of the tapering portion 34 has maximum internal depths of D11 and D12 (e.g., first and second maximum internal depths) at the upper and lower raised sections 38*a* and 38*b*, respectively, as measured perpendicularly from the interior surface 35 of the tapering portion 34. The secondary section 34*b* of the tapering portion 34 has a maximum internal depth D13 (e.g., first maximum internal depth) at a location where the attachment section 40 is formed as measured perpendicularly from the interior surface 35 of the tapering portion 34. The maximum internal depths D11, D12 of the primary section 34*a* are larger than the maximum internal depth D13 of the secondary section 34*b*.

Figure 14:
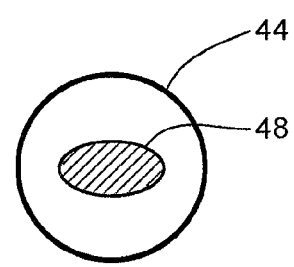
FIG. 14 is a cross sectional view of a pin of the mounting structure of the trim panel side showing an elongated cross section of a shaft portion of the pin.

As illustrated in FIGS. 3 and 4, one of a pair of nuts 42 is mounted on each of the raised plates 39 of the upper and lower raised sections 38*a* and 38*b*, respectively, of the tapering portion 34. The nuts 42 are made of metal or any other suitable material that is typically used in vehicles. Each of the nuts 42 clips a respective one of the raised plates 39. The nuts 42 are concentrically disposed relative to the through holes of the raised plates 39. A pin or trim clip 44 is mounted on the raised plate 41 of the attachment section 40. The pin 44 is made of POM (polyacetal) or any other suitable material that is typically used in vehicles. The pin 44 has a head portion 46, a shaft portion 48 and a pair of flange portions 49. The shaft portion 48 has an elongated or oblong cross section as viewed from a center axis of the shaft portion 48, as shown in FIG. 14. The head portion 46 is formed at one end of the shaft portion 48, and has a larger diameter than the shaft portion 48 to form an enlarged section. The flange portions 49 are formed at the other end of the shaft portion 48, and have a larger diameter than the shaft portion 48. The flange portions 49 are formed at spaced apart locations along the shaft portion 48 to define a gap therebetween. The shaft portion 48 is inserted into the notch of the raised plate 41 of the attachment section 40 such that flange portions 49 sandwich the raised plate 41 of the attachment section 40 from both sides. The shaft portion 48 is oriented such that a lengthwise direction L11 of the elongated cross section of the shaft portion 48 is arranged substantially parallel to the peripheral edge 36 of the trim panel 18 that is nearest the shaft portion 48 of the pin 44. More specifically, the lengthwise direction L11 of the elongated cross section of the shaft portion 48 is arranged substantially parallel to the lengthwise direction of the tapering portion 34 of the trim panel 18. The notch of the raised plate 41 also extends in a direction parallel to the lengthwise direction L11 of the elongated cross section of the shaft portion 48.

The pin 44 forms a part of a first mounting arrangement 30a of the mounting structure 30 that fixedly couples the trim panel 18 to the back door 12 at a location (e.g., first location) where the attachment section 40 is formed. The upper and lower raised portions 38a, 38b and the nuts 42 form a part of a second mounting arrangement 30b of the mounting structure 30 that fixedly couples the trim panel 18 to the back door 12 at locations (e.g., second locations) where the upper and lower raised sections 38a, 38b are formed.

Figure 5:
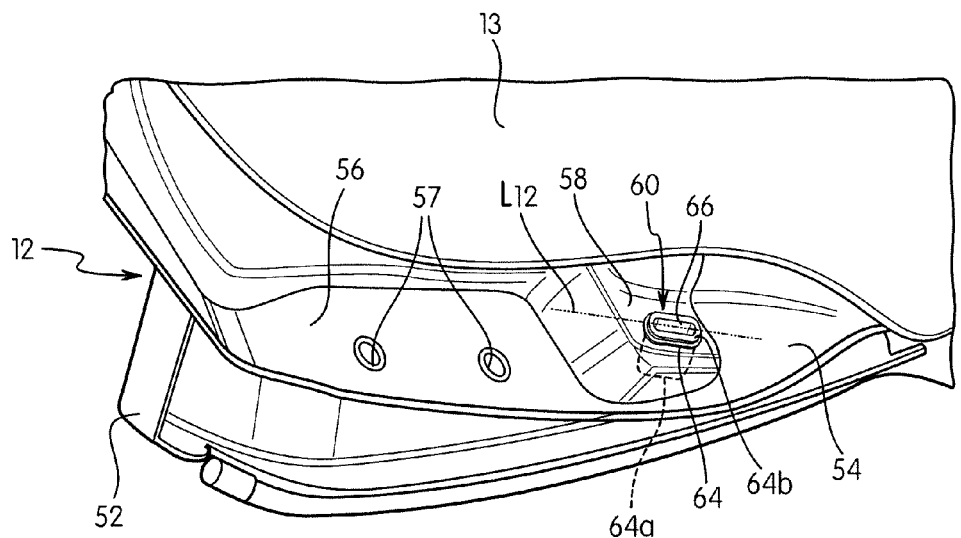
FIG. 5 is an enlarged perspective view of an exterior surface of the back door of the vehicle illustrated in FIG. 1 showing the mounting structure of the back door side.
Figure 6:
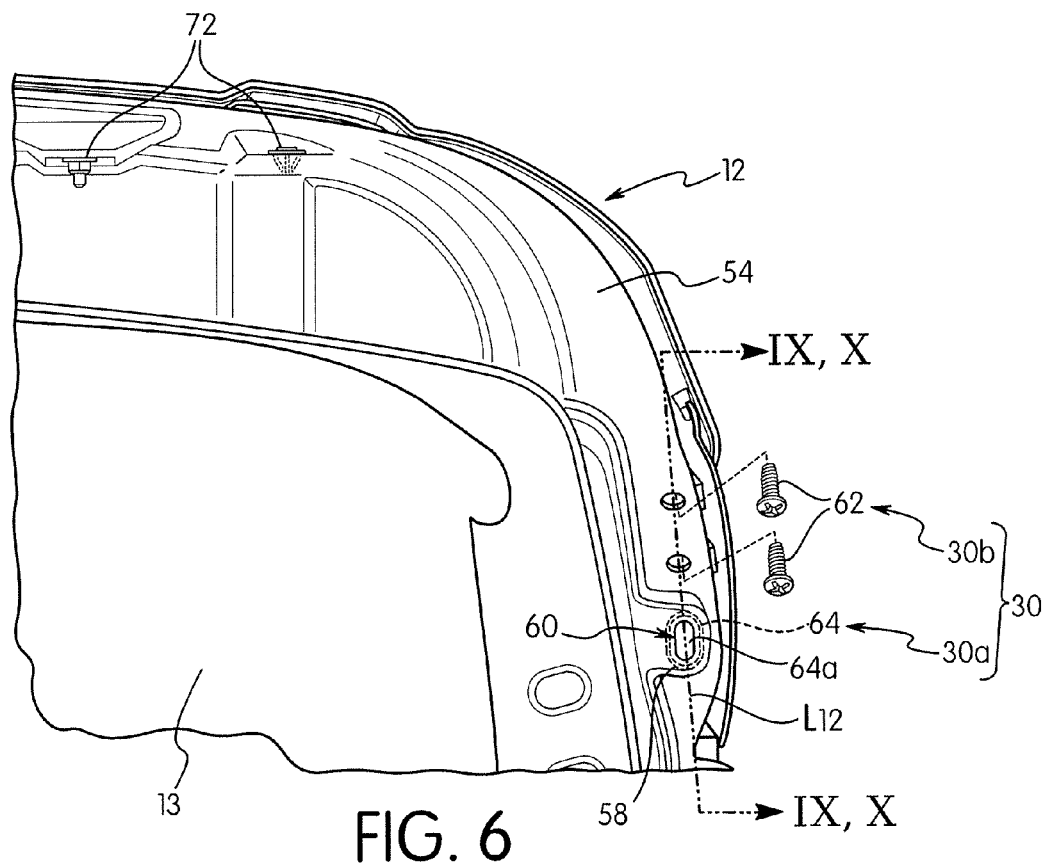
FIG. 6 is an enlarged elevational view of the rear body structure of the vehicle illustrated in FIG. 1 showing an interior surface of an exterior body panel of the back door while the trim panel is coupled to the exterior surface of the exterior body panel of the back door.
Figure 7:
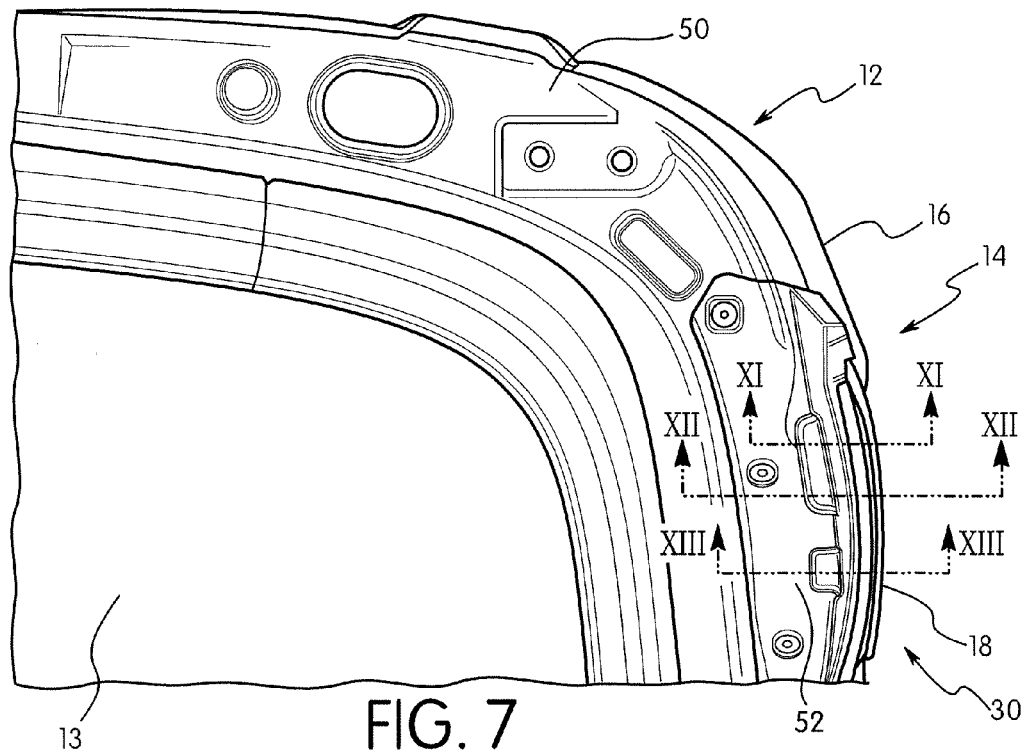
FIG. 7 is an enlarged elevational view of the rear body structure of the vehicle illustrated in FIG. 1, with interior body panels being disposed on the interior surface of the exterior body panel of the back door.
Figure 9:
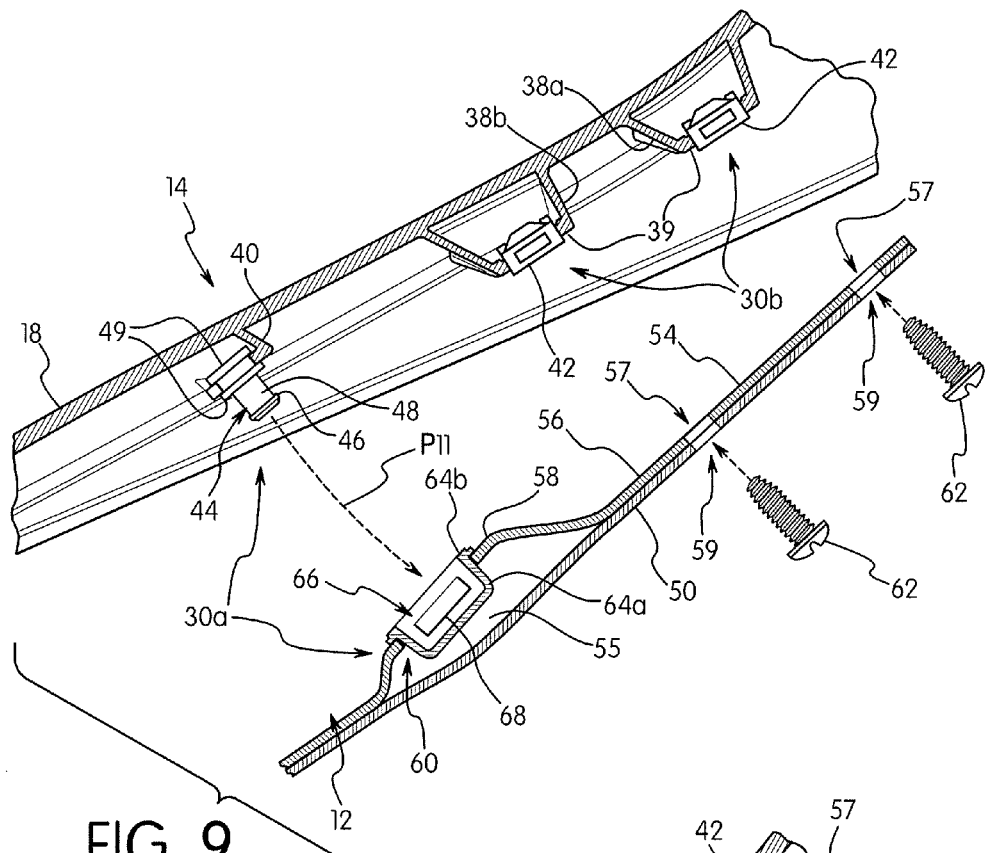
FIG. 9 is a partial cross sectional view of the rear body structure of the vehicle taken along line IX-IX in FIG. 6 showing the nonlinear movement during the installation of the trim panel relative to the back door.
Figure 10:
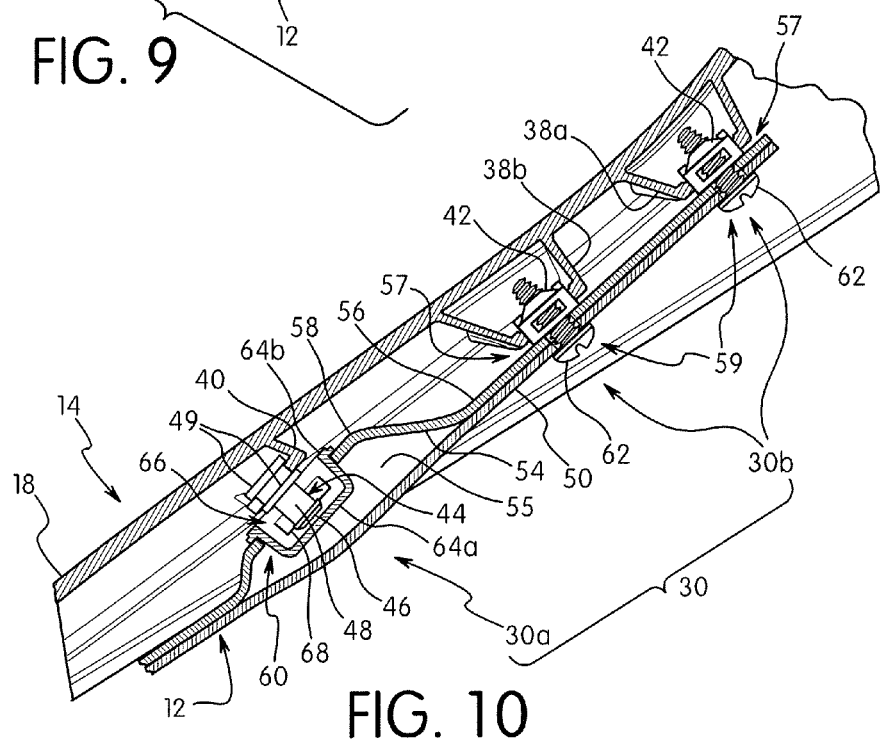
FIG. 10 is a partial cross sectional view of the rear body structure of the vehicle taken along line X-X in FIG. 6, with the trim panel being installed to the back door.

As illustrated in FIGS. 5-7, the back door 12 mainly includes an interior body panel (e.g., interior panel) 50 and an exterior body panel (e.g., exterior panel) 54 that cooperate to form a vehicle body panel. The back door 12 also includes a pair of side interior trim panels 52 (e.g., trim panels associated with a door obstruction detecting mechanism or other decorative door panels). As also illustrated in FIGS. 9-13, the interior body panel 50 is fixedly coupled to an interior surface of the exterior body panel 54 to improve an interior appearance of the vehicle 10 by hiding the mounting structures 30 behind the interior body panel 50 and the side interior trim panels 52. As illustrated in FIGS. 9 and 10, the interior body panel 50 includes a pair of through holes 59 that receive fasteners (e.g., bolts 62) for coupling the interior body panel 50 and the exterior body panel 54 to the trim panels 18. FIG. 7 illustrates one of the side interior trim panels 52 mounted to the interior body panel 50 on the left hand side (i.e., the right side of FIG. 7) of the back door 12. However, the other of the side interior trim panels 52 is mounted to the interior body panel 50 at the right hand side of the back door 12 in a mirrored configuration.

Figure 11:
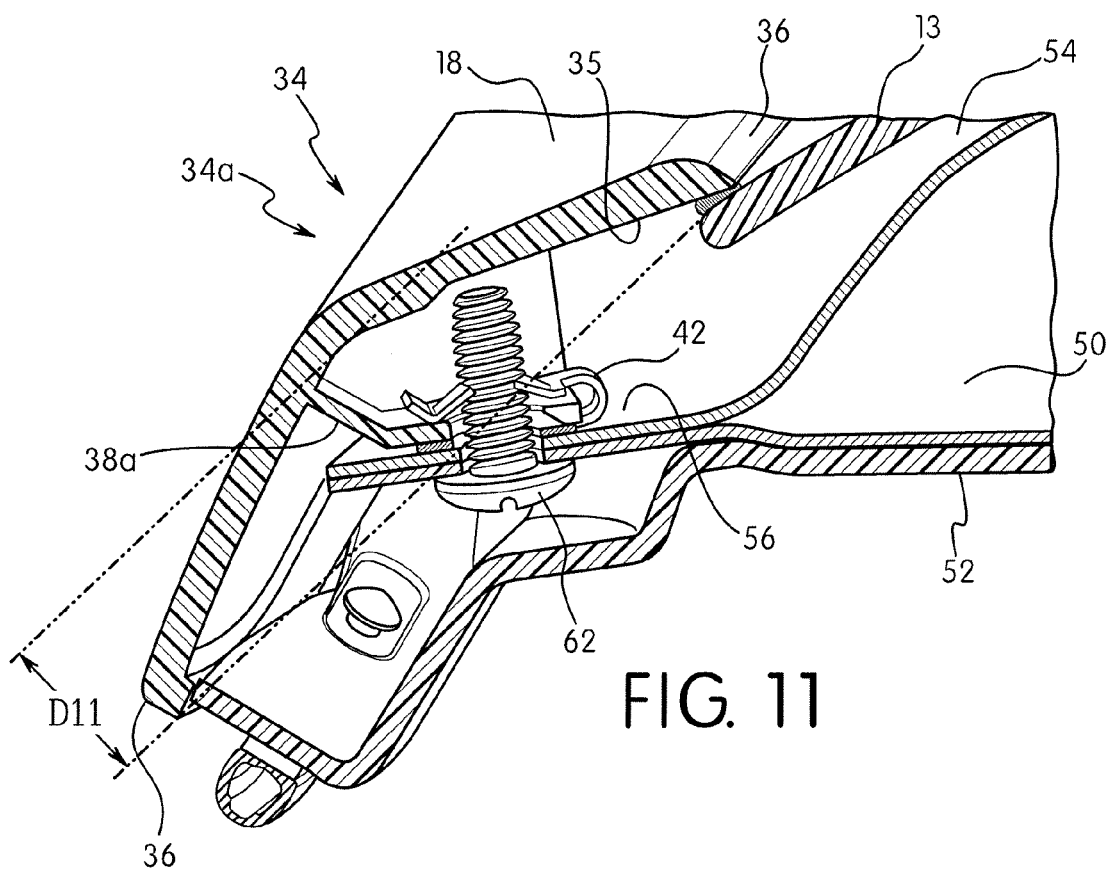
FIG. 11 is a partial cross sectional view of the rear body structure of the vehicle taken along line XI-XI in FIG. 7, with the trim panel being installed to the back door.
Figure 12:
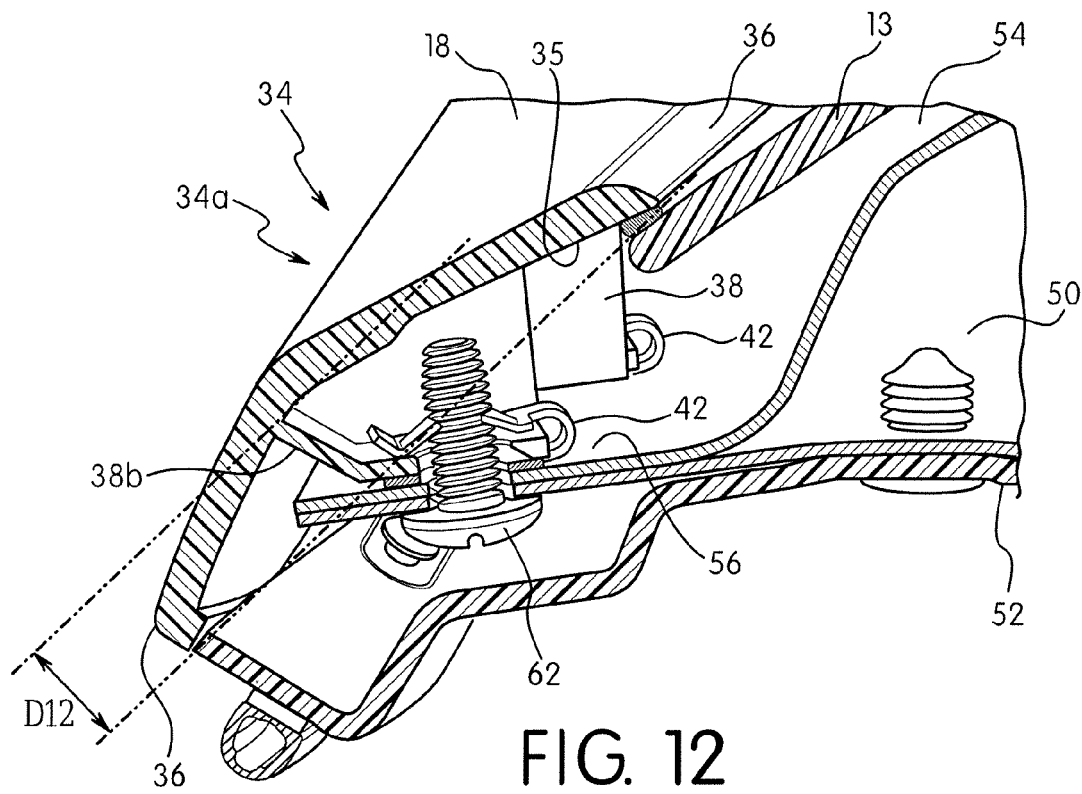
FIG. 12 is a partial cross sectional view of the rear body structure of the vehicle taken along line XII-XII in FIG. 7, with the trim panel being installed to the back door.
Figure 13:
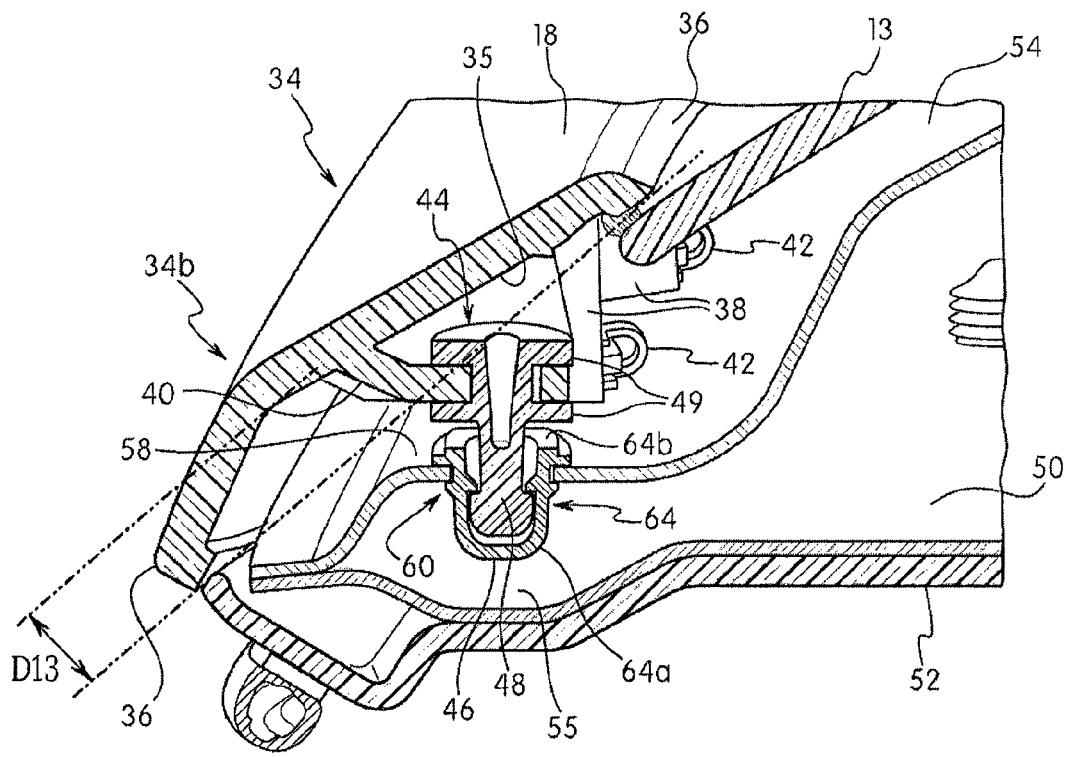
FIG. 13 is a partial cross sectional view of the rear body structure of the vehicle taken along line XIII-XIII in FIG. 7, with the trim panel being installed to the back door.

As illustrated in FIGS. 5 and 6, the exterior body panel 54 includes a base surface 56 and a mounting surface 58 on each lateral side of the exterior body panel 54. The exterior body panel 54 is made of metal or any other suitable material that is typically used in vehicles through a conventional press working. Hereinafter, the configuration of a left side portion of the exterior body panel 54 (i.e., right side in FIG. 6) will be explained in detail. The detailed description of the right side portion of the exterior body panel 54 will be omitted for the sake of the brevity since these configurations are mirrored structurally across a lateral center of the vehicle 10. The base surface 56 extends along a peripheral edge of the exterior body panel 54, and is exposed when the rear window glass 13 is mounted to the exterior surface of the back door 12 as illustrated in FIG. 5. The base surface 56 of the exterior body panel 54 abuts the interior body panel 50 along a majority of a perimeter of the mounting surface 58 (see FIGS. 9 and 10). The base surface 56 has a pair of through holes (e.g., additional apertures) 57. The through holes 57 are formed at locations corresponding to the upper and lower raised sections 38a, 38b of the trim panel 18 such that the through holes 57 face the through holes of raised plates 39 of the upper and lower raised sections 38a and 38b, respectively, when the trim panel 18 is coupled to the back door 12. Furthermore, the through holes 57 are formed at locations corresponding to the through holes (e.g., additional apertures) 59 of the interior body panel 50 such that the through holes 57 and the through holes 59 are concentrically aligned when the interior body panel 50 is coupled to the exterior body panel 54, as illustrated in FIGS. 10-12. The mounting surface 58 is raised relative to an adjacent portion on the base surface 56, and defines a cavity 55 below the mounting surface 58. In particular, the mounting surface 58 of the exterior body panel 54 cooperates with the interior body panel 50 to define the cavity 55 therebetween below the mounting surface 58 (see also FIG. 9). The mounting surface 58 has an aperture (e.g., aperture or seating aperture) 60 through which the cavity 55 is accessed. The aperture 60 extends to an opposite concave surface of the mounting surface 58 (see also FIGS. 9 and 10). The aperture 60 has an oval or elongated shape. The aperture 60 of the mounting surface 58 is formed at a location corresponding to the attachment section 40 of the trim panel 18 such that the cavity 55 of the mounting surface 58 accommodates the pin 44 of the mounting structure 30 when the trim panel 18 is coupled to the back door 12. The mounting surface 58 is angularly arranged with respect to the base surface 56 in a non-parallel manner; thereby center axes of the through holes 57 of the base surface 56 extend in a non-parallel direction relative to a center axis of the aperture 60 through the mounting surface 58.

As illustrated in FIGS. 6 and 10, a pair of bolts (e.g., fasteners) 62 is inserted in the through holes 59 of the interior body panel 50 and the through holes 57 of the exterior body panel 54, and fastened to the nuts 42 of the upper and lower raised sections 38a and 38b, respectively, for coupling the exterior body panel 54 to the trim panel 18. The bolts 62 can be other fasteners such as screws, rivets, adhesives or any suitable type of fastening members. Furthermore, as illustrated in FIGS. 5, 6, 9 and 10, a grommet 64 is fixedly coupled to the mounting surface 58 of the exterior body panel 54 within the aperture 60 of the mounting surface 58 with an adhesive or in any other suitable manner. In other words, the grommet 64 engages the aperture 60. The grommet 64 is made of rubber, or any other suitable material, such as metal or plastic. The grommet 64 mainly includes a body portion 64a and a head flange 64b. The body portion 64a of the grommet 64 is formed of an elliptic cylinder with a closed bottom that has an outer shape conforming to the shape of the aperture 60 of the mounting surface 58. The head flange 64b extends radially outward of the body portion 64a from an upper peripheral edge of the body portion 64a. The head flange 64b is disposed on the mounting surface 58 while the body portion 64a is disposed within the aperture 60 of the mounting surface 58.

The body portion 64a of the grommet 64 defines a mounting opening (e.g., mounting opening or mounting aperture) 66. The outline of the mounting opening 66 has an elongated or oblong shape. The mounting opening 66 has a lengthwise dimension in a lengthwise direction L12 that is larger than the lengthwise dimension of the head portion 46 of the pin 44 in the lengthwise direction L11. Furthermore, the mounting opening 66 has a widthwise dimension in a widthwise direction that is perpendicular to the lengthwise direction L12 of the mounting opening 66. The widthwise dimension of an upper peripheral edge of the mounting opening 66 is smaller than a widthwise dimension of the head portion 46. The grommet 64 further includes a pair of retainer prongs 68 on an inner peripheral edge (e.g., periphery) of the mounting opening 66. The retainer prongs 68 of the grommet 64 mate with the head portion 46 of the pin 44 to retain the pin 44 within the mounting opening 66 of the grommet 64 when the trim panel 18 is coupled to the back door 12. The shaft portion 48 of the pin 44 also engages the inner peripheral edge of the mounting opening 66 of the grommet 64 to retain the trim panel 18 to the exterior body panel 54 in an installed position. The grommet 64 is oriented such that the lengthwise direction L12 of the mounting opening 66 is arranged parallel to the lengthwise direction L11 (see FIG. 4) of the elongated cross section of the shaft portion 48 of the pin 44 when the trim panel 18 is coupled to the back door 12. Furthermore, the mounting opening 66 of the grommet 64 is also oriented such that the shaft portion 48 of the pin 44 moves along the lengthwise direction L12 of the elongated mounting opening 66 of the grommet 64 during the installation of the trim panel 18 to the exterior body panel 54 of the back door 12. Specifically, the pin 44 can slide in the lengthwise direction L12 within the mounting opening 66 of the grommet 64 after the head portion 46 passes the upper peripheral edge of the mounting opening 66 until the head portion 46 mates with the retainer prongs 68.

The grommet 64 forms a part of the first mounting arrangement 30a of the mounting structure 30 that fixedly couples the trim panel 18 to the back door 12 at the location (e.g., first location) where the attachment section 40 is formed. The bolts 62 form a part of the second mounting arrangement 30b of the mounting structure 30 that fixedly couples the trim panel 18 to the back door 12 at the locations (e.g., second locations) where the upper and lower raised sections 38a, 38b are formed.

Referring to FIGS. 6 and 8-10, an installation of the spoiler unit 14 (i.e., the rear spoiler 16 and the trim panel 18) to the back door 12 will be explained. Before coupling the spoiler unit 14 to the back door 12, the rear spoiler 16 and the trim panel 18 are coupled together with the screws 26 as illustrated in FIG. 3 to form the spoiler unit 14. The rear window glass 13 is disposed on the exterior surface of the exterior body panel 54 to cover the opening 22 of the back door 12. The nuts 42 and the pin 44 are coupled to the trim panel 18 and the grommet 64 is coupled to the exterior body panel 54 in the manner described above. The interior body panel 50 is coupled to the exterior body panel 54. A coupling portion (not shown) of the rear spoiler 16 loosely engages the exterior body panel 54 (e.g., via one or more fasteners between the rear spoiler 16 and the exterior body panel 54) such that the spoiler unit 14 is allowed to pivot about the coupling portion relative to the exterior body panel 54. Furthermore, as illustrated in FIGS. 8 and 10, the spoiler unit 14 is pivoted downward about the coupling portion toward the exterior body panel 54 along a nonlinear or pivotal installation path P11 relative to the exterior body panel 54 such that the pin 44 snaps into the grommet 64. Specifically, the head portion 48 of the pin 44 is inserted into the mounting opening 66 of the grommet 64, and engages the retainer prongs 68 of the grommet 64. In the installed position, the upper and lower raised sections 38a, 38b of the trim panel 18 are aligned with the through holes 57 of the exterior body panel 54. Furthermore, the bolts 62 are inserted through the through holes 59 of the interior body panel 50 and the through holes 57 of the exterior body panel 54 and are fastened to the nuts 42 of the upper and lower raised sections 38a and 38b, respectively. As a result, the spoiler unit 14 is fixedly coupled to the exterior body panel 54 of the back door 12. After this, additional fasteners 72 can also be applied to fixedly couple the coupling portion of the rear spoiler 16 to the exterior body panel 54.

One advantage of the present application relates to the fact that the mounting surface 58 of the exterior body panel 54 is formed as a raised body surface, and the trim panel 18 is coupled to the mounting surface 58 of the exterior body panel 54 at the distal end portion 37 of the trim panel 18. Thus, even if a narrow area of the exterior body panel 54 is exposed at this location before subsequently tapering off to an outer edge of the exterior body panel 54, the trim panel 18 can be securely coupled to the exterior body panel 54 of the back door 12. Furthermore, the depth of the trim panel 18 at the mounting surface 58 can be designed to be relatively small, thus allowing the attachment section 40 of the pin 44 to be proportionately shorter. As a result, the first mounting arrangement 30a of the trim panel 18 can be formed more rigidly.

Also, as described above, the primary section 34a of the trim panel 18 is coupled the exterior body panel 54 via the second mounting arrangement 30b, and the secondary section 34b of the trim panel 18 is coupled to the exterior body panel 54 via the first mounting arrangement 30a. Since the secondary section 34b of the trim panel 18 is directly coupled to the exterior body panel 54 in this arrangement, separation between the distal end portion 37 of the trim panel 18 and the exterior body panel 54 as well as separation between the trim panel 18 and the rear window glass 13 are both avoided, thus improving the exterior appearance of the vehicle 10. Furthermore, even if the secondary section 34b of the trim panel 18 does not have enough width or thickness to accommodate the second mounting arrangement 30b (i.e., the upper and lower raised sections 38a, 38b), the secondary section 34b of the trim panel 18 can be securely coupled to the exterior body panel 54 of the back door 12 with the first mounting arrangement 30a (i.e., the pin 44 and the grommet 64) alone.

Additionally, the mounting opening 66 of the grommet 64 has an elongated shape in order to accommodate the shaft portion 48 of the pin 44. The mounting opening 66 of the grommet 64 is oriented such that the shaft portion 48 of the pin 44 partially moves along the lengthwise direction L12 of the mounting opening 66 during the installation of the trim panel 18 to the exterior body panel 54. Thus, even if a nonlinear installation path P11 is required during the installation of the trim panel 18 to the back door 12, the pin 44 can be easily inserted into and accommodated within the mounting opening 66 of the grommet 64. As a result, the trim panel 18 can be easily coupled to the back door 12.

Furthermore, the shaft portion 48 of the pin 44 also has an elongated cross section. The shaft portion 48 of the pin 44 is oriented such that the lengthwise direction L12 of the elongated cross section is arranged substantially parallel to the peripheral edge 36 of the trim panel 18 that is nearest the shaft portion 48 of the pin 44. Thus, even if lateral forces are applied to the peripheral edges 36 of the trim panel 18 (e.g., from user activity such as cleaning the window glass 13 or loading/unloading a cargo area through the back door 12), the shaft portion 48 of the pin 44 can receive the lateral force with a larger projected area of the shaft portion 48 of the pin 44. Thus, the strength of the connection between the trim panel 18 and the exterior body panel 54 against the lateral force applied to the trim panel 18 can be increased. Therefore, the trim panel 18 can be more securely coupled to the exterior body panel 54 once the spoiler unit 14 is installed to the back door 12.

In the above-mentioned embodiment, the pin 44 is mounted to the trim panel 18, and the grommet 64 is mounted to the exterior body panel 54 of the back door 12. Alternatively, the pin 44 can be mounted to the mounting surface 58 of the exterior body panel 54, and the grommet 64 can be mounted to the trim panel 18.

In understanding the scope of the present invention, as used herein to describe the above embodiment, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

While only a preferred embodiment has been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature. Thus, the foregoing descriptions of the embodiment according to the present invention are provided for illustration only, and not for the purpose of limiting the invention as defined by the appended claims and their equivalents.

What is claimed is:

1. A vehicle body structure comprising:
a vehicle body panel including an interior panel and an exterior panel that are fixed to one another, with the exterior panel including a base surface extending along a peripheral edge of the vehicle body panel and a mounting surface that is raised relative to an adjacent portion of the base surface, the mounting surface defining an aperture that extends to an opposite concave surface of the exterior panel, and with the base surface of the exterior panel abutting the interior panel along a majority of a perimeter of the mounting surface;
a trim panel coupled to the vehicle body panel; and
a first mounting arrangement coupling the trim panel to the vehicle body panel, the first mounting arrangement being engaged with a periphery of the aperture through the mounting surface to at least partially retain the trim panel to the vehicle body panel in an installed position.

2. The vehicle body structure according to claim 1, further comprising
a window panel disposed on the vehicle body panel such that the window panel covers an opening defined by the vehicle body panel,
the trim panel extending along a peripheral edge portion of the window panel.

3. The vehicle body structure according to claim 1, wherein
the first mounting arrangement includes a pin with a shaft portion and a grommet that engages the aperture and defines a mounting opening, the pin being mounted to the trim panel, the grommet being mounted to the vehicle body panel, the shaft portion of the pin being engaged with a periphery of the mounting opening to at least partially retain the trim panel to the vehicle body panel in the installed position.

4. The vehicle body structure according to claim 3, wherein
the shaft portion of the pin has an elongated cross section, the shaft portion of the pin being oriented such that a lengthwise direction of the elongated cross section is arranged substantially parallel to a peripheral side edge of the trim panel that is nearest the shaft portion of the pin.

5. The vehicle body structure according to claim 1, further comprising
a second mounting arrangement fixedly coupling the trim panel to the vehicle body panel, the first and second mounting arrangements coupling the trim panel to the vehicle body panel at first and second locations, respectively, the second location being spaced from the first location,
the first and second mounting arrangements being configured relative to the trim panel and the vehicle body panel such that the trim panel requires a nonlinear installation path with respect to the vehicle body during installation of the trim panel to the vehicle body panel via the first and second mounting arrangements.

6. The vehicle body structure according to claim 5, wherein
the first mounting arrangement includes a pin with a shaft portion and a grommet that engages the aperture and defines a mounting opening, the pin being mounted to the trim panel, the grommet being mounted to the vehicle body panel, the shaft portion of the pin being engaged with a periphery of the mounting opening to at least partially retain the trim panel to the vehicle body panel in the installed position.

7. The vehicle body structure according to claim 6, wherein
an outline of the mounting opening in the grommet has an elongated shape, the mounting opening of the grommet being oriented such that the shaft portion of the pin moves along a lengthwise direction of the mounting opening of the grommet during installation of the trim panel to the vehicle body panel via the first and second mounting arrangements.

8. The vehicle body structure according to claim 1, wherein
the first mounting arrangement includes a pin with a shaft portion, the shaft portion having an elongated cross section.

9. The vehicle body structure according to claim 8, wherein
a lengthwise direction of the elongated cross section of the shaft portion is arranged substantially parallel to a peripheral side edge of the trim panel that is nearest the shaft portion of the pin.

10. The vehicle body structure according to claim 1, wherein
the mounting surface of the vehicle body panel is angularly arranged with respect to the base surface of the exterior panel in a non-parallel manner.

11. The vehicle body structure according to claim 1, further comprising
a window panel disposed on the vehicle body panel,
the trim panel extending along respective peripheral edges of the vehicle body panel and the window panel.

12. The vehicle body structure according to claim 1, further comprising
a second mounting arrangement coupling the trim panel to the vehicle body panel at a location on the base surface of the exterior panel, the second mounting arrangement being spaced apart from the first mounting arrangement.

13. The vehicle body structure according to claim 12, wherein
the second mounting arrangement includes a standoff that protrudes from an interior surface of the trim panel such that a distal end of the standoff is aligned with a distal end of the first mounting arrangement in a longitudinal direction of the trim panel.

14. The vehicle body structure according to claim 13, wherein
the second mounting arrangement includes a fastener that passes through an additional aperture through both the interior panel and the base surface of the exterior panel to engage the standoff of the second mounting arrangement.

15. The vehicle body structure according to claim 1, wherein
the first mounting arrangement is located at a tapering end portion of the trim panel.

16. The vehicle body structure according to claim 1, wherein
   the trim panel includes a primary portion and a secondary portion, the first mounting arrangement being located on the secondary portion.

17. The vehicle body structure according to claim 16, wherein
   the secondary portion meets the primary portion at an end of the secondary portion that is opposite a tapering end portion of the trim panel.

\* \* \* \* \*